United States Patent [19]

Tenmyo

[11] Patent Number: 4,616,294
[45] Date of Patent: Oct. 7, 1986

[54] ELECTRONIC FLASH DEVICE

[75] Inventor: Yoshiharu Tenmyo, Tokyo, Japan

[73] Assignee: Canon Kabushiki Kaisha, Tokyo, Japan

[21] Appl. No.: 792,509

[22] Filed: Oct. 29, 1985

[30] Foreign Application Priority Data

Nov. 6, 1984 [JP] Japan .................. 59-168285

[51] Int. Cl.⁴ .................. G03B 15/02; F21V 7/08
[52] U.S. Cl. .................. 362/18; 362/350
[58] Field of Search .................. 362/16, 18, 17, 345, 362/347, 350, 3; 354/145.1

[56] References Cited

U.S. PATENT DOCUMENTS 4,190,880 2/1980 Esaki .................. 362/18

FOREIGN PATENT DOCUMENTS 741194 8/1966 Canada .................. 362/16
2757846 6/1979 Fed. Rep. of Germany .................. 362/18
127536 10/1980 Japan .................. 362/18

Primary Examiner—William A. Cuchlinski, Jr.
Assistant Examiner—Diana M. Cox
Attorney, Agent, or Firm—Toren, McGeady, Stanger, Goldberg & Kiel

[57] ABSTRACT

Disclosed is a reflector for an electronic flash device capable of changing the illuminating angle. The reflector is nearly of elliptical shape as in the case of the conventional one, wherein the ratio of the longer diameter of the ellipse to the shorter one and the shorter diameter itself are set at special values. Thus, the reflector can be designed small, while the same illuminating angle as in a case where a wide angle adapter is mounted on the flash device can be obtained.

5 Claims, 3 Drawing Figures

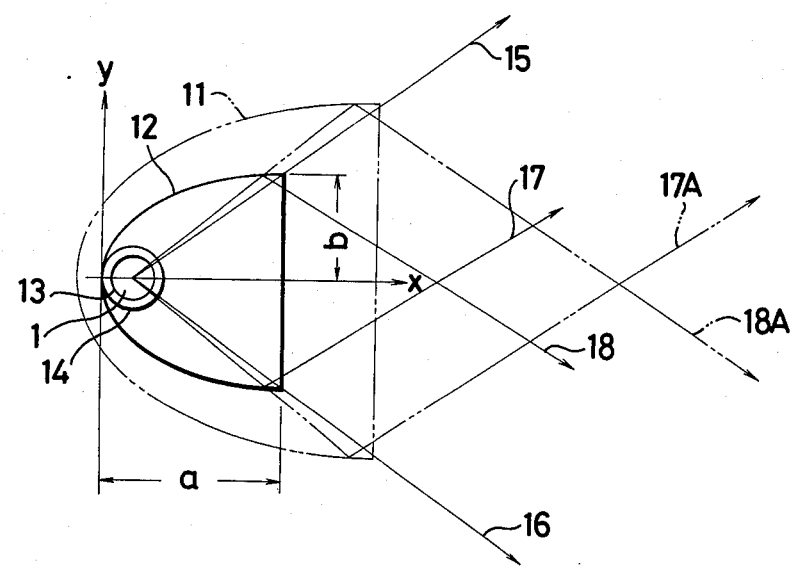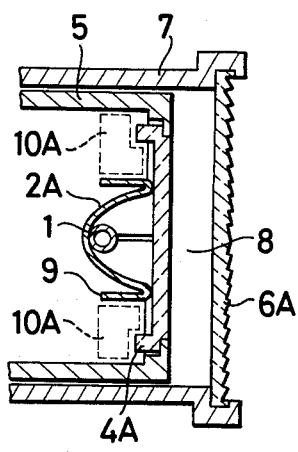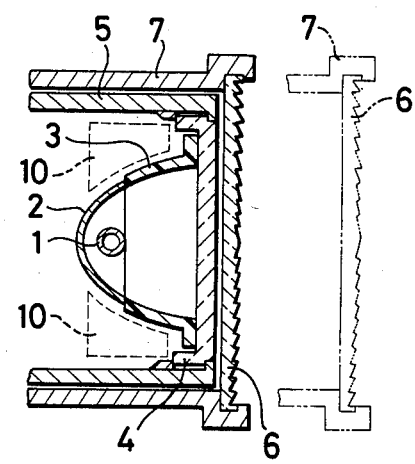

ELECTRONIC FLASH DEVICE

BACKGROUND OF THE INVENTION

1. Field of the Invention

The present invention relates to an electronic flash device, and particularly to an electronic flash device capable of changing the illuminating angle.

2. Description of the Prior Art

Until now, in order to adjust the illuminating angle of a flash device according to the focal length of a photographic lens, a Fresnel lens is arranged in front of a light emitting part to be movable in the direction of the optical axis. The size of the flash device is remarkably large as compared with a flash device incapable of changing the illuminating angle. It is inconvenient for handling. Although the flash device of this kind can cover the picture angle of photographic lenses of 28 mm to 85 mm for a 35 mm camera, the device of the same shape is not fit for a lens of wider angle, for example, 24 mm lens. Therefore, it is necessary to mount a wide adapter with dispersion characteristics on the flash device. It makes the handling all the more complicated.

FIG. 3 shows a sectional view of the conventional flash device. In the drawing, 1 is a flash discharge tube, 2 is a back metal formed of metal for radiating the heat from the discharge tube 1. 3 is a reflector formed of plastics. The back metal 2 and the reflector 3 are combined to form a reflector almost in the shape of ellipse. The discharge tube 1 is arranged in the neighborhood of the focal point of the reflector. 4 is a dispersing plate for homogenizing light emitted from the discharge tube 1 and adjusting color of light emitted from the discharge tube 1 so as to have a spectrum similar to that of the sun beam. The back metal 2, the reflector 3 and the dispersing plate 4 are secured to the body 5.

6 is a Fresnel lens whose Fresnel plane is formed at the side opposite to the light emitting part. The Fresnel lens 6 is secured to a movable frame 7 and is movable in the direction of the optical axis according to the focal length of a photographic lens, changing the illuminating angle. In FIG. 3, a position of the Fresnel lens 6 shown by the solid line corresponds to the picture angle of a 28 mm lens, while the position shown by the two-dot-dash line corresponds to the picture angle of an 85 mm lens. The reflector is almost of elliptical shape as mentioned above. The shape of this conventional reflector is represented as follows:

$$\frac{(x-a)^2}{a^2} + \frac{y^2}{b^2} = 1, \frac{a}{b} \approx 1.7, b = 10 \text{ (mm)}$$

where $2a$ is a longer diameter of the reflector, and $2b$ is a shorter diameter of the reflector. Further, as the Fresnel lens 6, a panel with the focal length of about 60 mm is often used. The moving distance of the Fresnel lens 6 is about 20 mm, so that the illuminating angle covering the lenses of 28 mm to 85 mm can be obtained.

The above construction can cover the picture angle of the 28 mm lens, as mentioned above, for the lenses of wider angle it is necessary to mount the adapter such as the wide panel in order to enlarge the illuminating angle. It makes the handling complicated.

SUMMARY OF THE INVENTION

It is, accordingly, an object of the present invention to provide an electronic flash device capable of removing the shortcomings of the above-mentioned conventional electronic flash device.

It is another object of the present invention to provide an electronic flash device capable of changing the illuminating angle covering a wide angle lens of 24 mm to a telephoto lens without using a wide adapter.

Other objects of the present invention will become apparent from the following description of a preferred embodiment thereof with reference to the accompanying drawings.

BRIEF DESCRIPTION OF THE DRAWINGS

FIG. 1 is a schematic sectional view of an electronic flash device as an embodiment of the present invention.

FIG. 2 is a sectional view of a reflector of the flash device shown in FIG. 1.

FIG. 3 is a sectional view of a reflector of a conventional flash device.

DETAILED DESCRIPTION OF THE PREFERRED EMBODIMENT

FIG. 1 is a schematic sectional view of a reflector of almost elliptical shape. A conventional reflector is represented by a two-dot-dash line 11, while a flash device of the present invention, which has been reduced similarly to the conventional reflector, is represented by a solid line 12. 13 is an internal diameter of the discharge tube 1, and 14 is an external diameter of the discharge tube 1. The illuminating angle of a representative light beam from the discharge tube 1, namely, direct light 15 and 16 and light 17 and 18 reflected once from the reflector 12, is similar to that of a representative light beam (15, 16, 17A and 18A) produced by the conventional flash device having the reflector 11.

As to a light beam from positions other than the center of the discharge tube 1, the illuminating angle of the smaller reflector 12 of the present invention is a little larger, and, however, the both illuminating angles are almost equivalent. The reflector 12 is designed so that the illuminating angle of the direct light 15 and 16 and that of the once reflected light 17 and 18 are almost equal.

Accordingly, by means of the reflector 12 of the present invention shown in FIG. 1, a picture of good quality and with even illumination can be obtained.

The shape of the reflector 12 shown in FIG. 1 can be represented as follows:

$$\frac{(x-a)^2}{a^2} + \frac{y^2}{b^2} = 1, 1.5 \leq \frac{a}{b} \leq 1.9$$

where $2a$ is a longer diameter of the ellipse of the reflector 12 shown in FIG. 1, and $2b$ is a shorter diameter of the ellipse of the reflector 12 shown in FIG. 1.

The above relation shows the optimum values, wherein the discharge tube 1 is arranged at the focal point of the reflector 12. However, practically there is no problem even if $1.2 \leq a/b \leq 2.3$.

By arranging the discharge tube 1 almost at the focal point of the elliptical reflector and reducing the reflector in a similar scale in this way, an optical system in which the light beams (15, 16, 17 and 18) having passed the reflector are almost equivalent to that of the conventional flash device capable of changing the illuminating angle can be constructed.

In the case of the conventional device shown in FIG. 3, the illuminating angle can cover the 28 mm lens only, where the Fresnel lens 6 is in the position represented by the solid line closest to the light emitting part. However, when the reduced equivalent reflector 12 shown in FIG. 1 is used and the Fresnel lens 6 is arranged close to the discharge tube 1, a further wider illuminating angle can be covered. Namely, a lens of the focal length shorter than 28 mm can be covered.

According to the present invention, the size of the reflector can be reduced on the basis of the above conception.

Below, the embodiment of the present invention will be described in detail with reference to FIG. 2.

FIG. 2 is a sectional view of an electronic flash device of the present invention, wherein members having the same refrence numerals as in the conventional device shown in FIG. 3 are the same members.

1 is a flash discharge tube, 2A is a reflector whose surface is totally formed of metal, 4A is a dispersing plate, 5 is a light emitting body, 6A is a Fresnel lens and 7 is a movable frame.

FIG. 2 shows the state where the distance between the discharge tube 1 and the Fresnel lens 6A is the same as that of the case shown by the solid line in FIG. 3, in which the 28 mm lens can be covered. By reducing the reflector 2A as shown in FIG. 1, there takes place a space 8 in front of the dispersing plate 4A, so that it is possible to bring the Fresnel lens 6A closer to the discharge tube 1. When the Fresnel lens 6A is further moved to the left from the state shown in FIG. 2 to be in contact with the dispersing plate 4A, the illuminating angle covering the 24 mm lens can be obtained.

The shape of the reflector 2A can be represented as follows:

$$\frac{(x-a)^2}{a^2} + \frac{y^2}{b^2} = 1, \quad 1.5 \leq \frac{a}{b} \leq 1.9, \quad 5 \text{ mm} \leq b \leq 7 \text{ mm}$$

The above conditions are the optimum values. Further, practically, there takes place no problem even when $1.2 \leq a/b \leq 2.3$, while there takes place no problem even when $4 \text{ mm} \leq b \leq 8 \text{ mm}$.

On the other hand, although, when the size of the reflector is reduced in this way, the illuminating angle is enlarged to cover a lens of the focal length shorter than 28 mm, there takes place another problem. Namely, the moving amount of the Fresnel lens and the movable frame increases, and an illuminating angle changing mechanism itself becomes large. Thus, it bccomes necessary to enlarge the change amount of the illuminating angle by increasing the power of the Fresnel lens so as to diminish the moving amount.

For this problem, it is possible to make the moving amount almost equivalent to that of the conventional device so that the illuminating angle covers the picture angle of a lens of 24 mm to 85 mm, by applying a Fresnel lens whose focal length is 40–45 mm at the center and gradually longer toward the circumference. The Fresnel lens 6A shown in FIG. 2 is designed as mentioned above in order to solve the second problem.

If the reflecter is simply reduced, the heat produced in the flash discharge tube 1 cannot be radiated fully and there is a possibility that a connecting part of the back metal 2 to the molded reflector 3 shown in FIG. 3 burns. However, the whole body of the reflector 2A of the present invention is formed of metal (high bright aluminum), while further the circumference of the reflector 2A is provided with a radiating fin 9 in order to increase the heat radiating efficiency.

By reducing the size of the reflector, the volume is decreased down to $\frac{1}{3}$, while a space 10A at the back becomes smaller than a space 10 (FIG. 13) of the conventional device, so that it is possible to make use of the space in the flash device body.

As mentioned above, according to the present invention, it is possible to obtain an electronic flash device which is smaller than the conventional one and able to change over the illuminating angle with a simple operation in order to cover the 24 mm lens without using a wide adapter.

What is claimed is:

1. An electronic flash device comprising:
   (a) reflector, said reflector being almost elliptical and represented by $$\frac{(x-a)^2}{a^2} + \frac{y^2}{b^2} = 1$$

$$1.2 \leq \frac{a}{b} \leq 2.3, \quad 4 \text{ mm} \leq b \leq 8 \text{ mm}$$

where $2a$ is a longer diameter of the ellipse formed by said reflector and $2b$ is a shorter diameter of the ellipse formed by said reflector; and
   (b) supporting means for supporting said reflector at a predetermined position.

2. An electronic flash device according to claim 1, further comprising:
   an optical system arranged in front of said reflector, said optical system including a plurality of parts having different focal lengths, in which the nearer the circumference of said optical system, the longer said focal lengths.

3. An electronic flash device according to claim 2, wherein said optical system is a Fresnel lens.

4. An electronic flash device according to claim 1, wherein said reflector is formed of metal having a heat radiating fin.

5. An electronic flash device according to claim 4, wherein said heat radiating fin is formed at the end portion of said metal reflector.

* * * * *